Figure 1A:
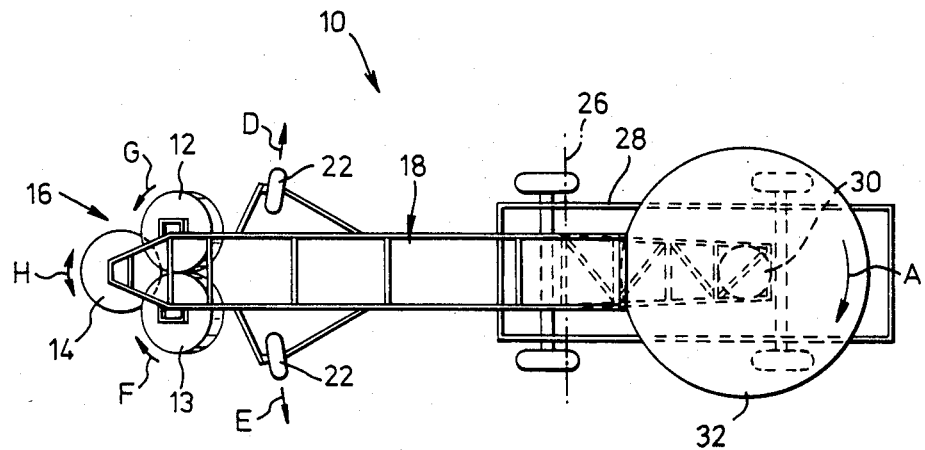

United States Patent [19]

Berry et al.

[11] Patent Number: 4,513,689
[45] Date of Patent: Apr. 30, 1985

[54] POULTRY-HARVESTING ASSEMBLY

[75] Inventors: Paul S. Berry, Bromham; John A. Benson, Wootton; Peter J. Kettlewell, Manchester; Michael J. B. Turner, Clophill, all of England

[73] Assignee: National Research Development Corporation, London, England

[21] Appl. No.: 603,335

[22] Filed: Apr. 24, 1984

[30] Foreign Application Priority Data

Apr. 29, 1983 [GB] United Kingdom ................. 8311814

[51] Int. Cl.³ .............................................. A01K 45/00
[52] U.S. Cl. ...................................................... 119/82
[58] Field of Search ........................................... 119/82

[56] References Cited

U.S. PATENT DOCUMENTS

| 3,672,335 | 6/1972 | Sanders | 119/82 |
| 3,805,744 | 4/1974 | Jochum | 119/82 |
| 4,037,565 | 7/1977 | Ledwell, Jr. | 119/82 |

Primary Examiner—Hugh R. Chamblee
Attorney, Agent, or Firm—Cushman, Darby & Cushman

[57] ABSTRACT

A broiler harvester 10 (FIG. 1a) comprises contra-rotating pick-up rotors 12, 13 and a third pick-up rotor 14 arranged in front of and co-operating with the other two rotors in a triangular formation. In operation the rotors 12, 13 discharge the broilers on to a conveyor belt 18 which in turn discharges them on to a turntable 32 where they remain until removed for packing into crates etc. The support frame 20 for belt 18 is able to scan back and forth around an arc to accelerate the harvesting operation, the front rotor 14 at all times being rotated in the direction of the scan.

4 Claims, 8 Drawing Figures

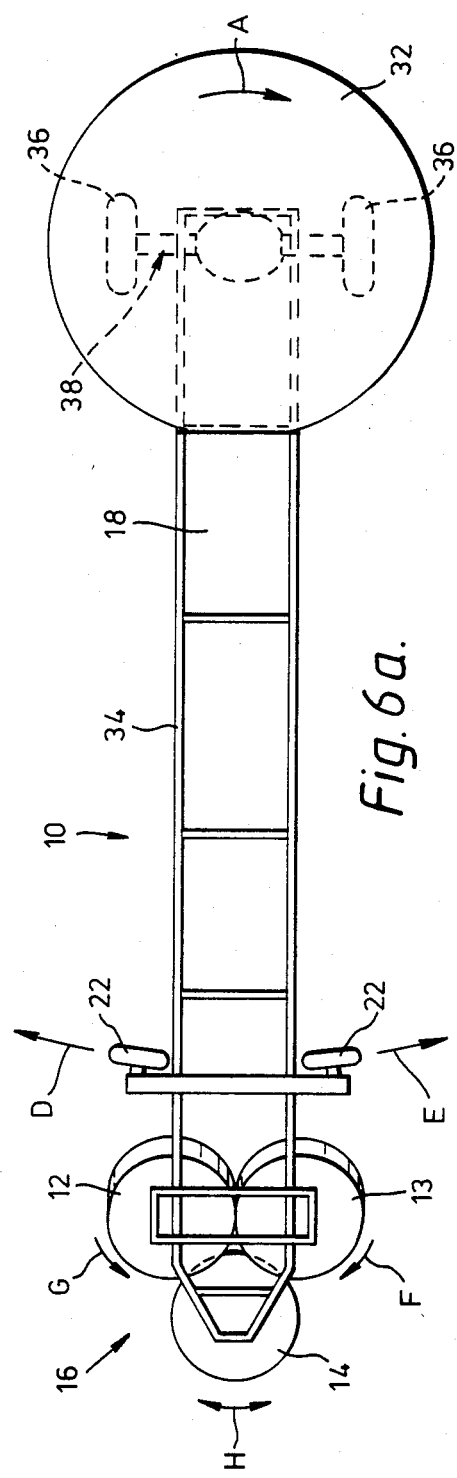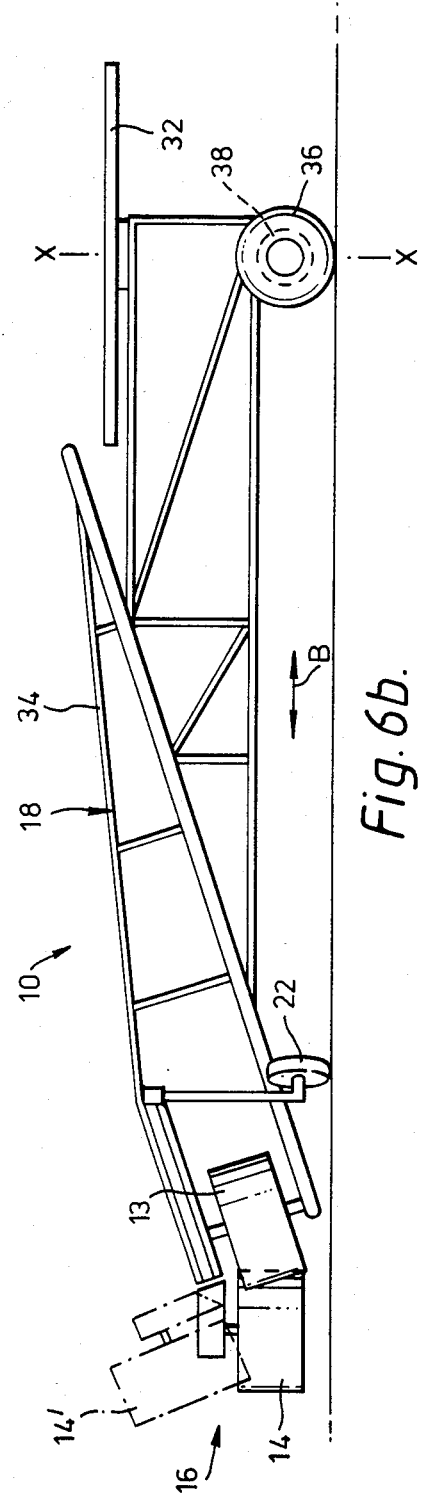

POULTRY-HARVESTING ASSEMBLY

The present invention relates to a poultry-harvesting assembly e.g. for harvesting birds from the litter in a broiler or rearing house.

One such assembly e.g. for harvesting chickens from the litter in a broiler house, is disclosed in co-pending U.S. patent application Ser. No. 545,260 and comprises two rotors arranged side by side with each rotor providing a continuous array of radially extending guide elements abutting and/or intermeshing with the guide elements of the other rotor, and drive means for contra-rotating the two rotors about vertical or predominantly vertical axes so that the guide elements co-operate to transmit birds between the two rotors to a discharge location.

According to the present invention, a poultry harvester as above described includes a third such rotor arranged in front of and co-operating with the other two rotors in a triangular formation.

Conveniently, in operation of the harvester, the birds can be collected with a scanning movement with the front rotor rotating in the direction of scan and the other two rotors contra-rotating as above described.

Conveniently, the three rotors are carried at one end of a support arm which is pivotally mounted at its other end for movement about a vertical axis.

Alternatively, the three rotors may be carried at one end of a support arm mounted at its other end on a ground-wheel supported chassis incorporating a differential gear between the ground wheels.

Figure 1B:
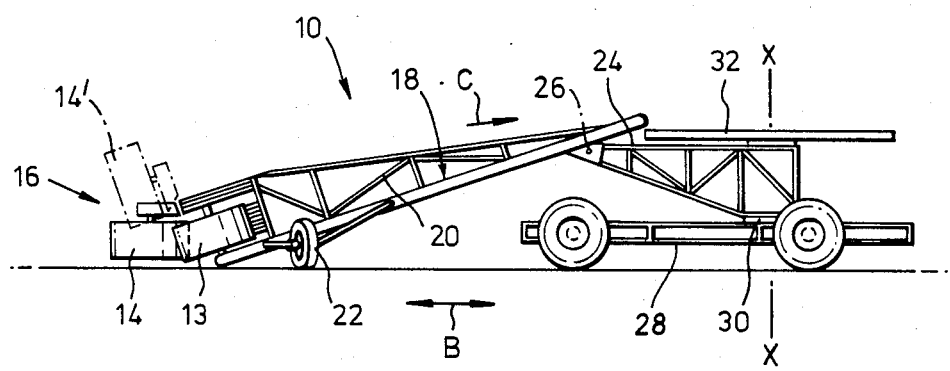
Figure 2:
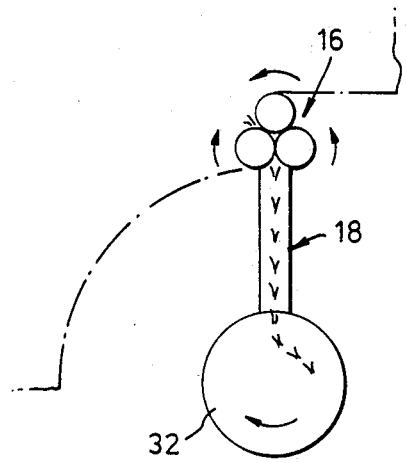
Figure 3:
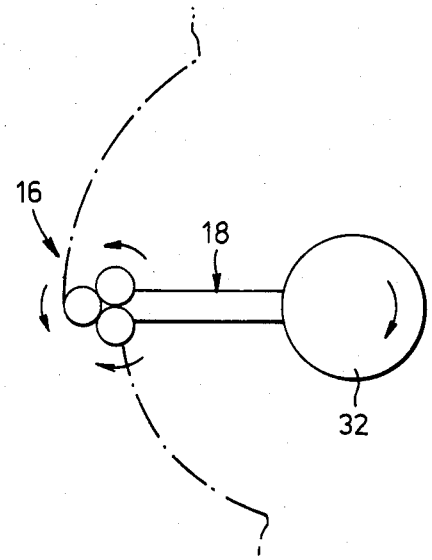
Figure 4:
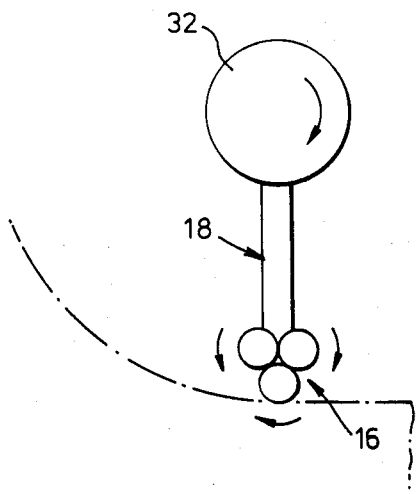

Embodiments of the invention will now be described, by way of example only, with reference to the accompanying drawings in which:

FIGS. 1a and 1b are respectively plan and side views of a first embodiment of the harvester;

FIGS. 2 to 5 diagrammatically illustrate the operation of the harvester; and

FIGS. 6a and 6b are respectively plan and side views of a second embodiment of the harvester.

Thus referring first to FIGS. 1a and 1b, a module bird-harvester 10 in accordance with the present invention comprises three rotors 12, 13, 14 mounted in a triangular formation to provide a pick-up head 16 at the front end of the harvester.

As already described in the co-pending application referred to above, each of the rotors 12, 13, 14 provides an array of flexible rubber fingers of the sort currently used for plucking chicken carcasses.

Behind the pick-up head 16, is an angled conveyor belt 18. The support frame 20 for belt 18 is carried at one end by two wheels 22 and at the other end by a scanning arm 24 to which it is attached by a horizontal pivot 26 allowing the conveyor to pivot up and down.

The arm 24 is mounted on the harvester chassis 28 by means of a turntable 30 allowing the arm to scan an arc on vertical axis XX (FIG. 1b).

The arm 24 also supports a second turntable 32 with a large diameter top arranged to receive birds from the discharge end of conveyor 18. The turntable 32 rotates independently of the arm 74 and is powered to rotate in one direction only such as shown by arrow A.

The drives on the harvester can be mechanical, electrical, hydraulic or pneumatic, or any combination of these, the prime mover (not shown) being carried on the chassis 28. This can be used to drive the machine either forward or backwards as shown by arrow B. The wheels 22 would be steered to allow the vehicle to manoeuvre.

The conveyor is powered to convey rearwardly as shown by arrow C. The scanning action of the conveyor frame 20 and the scanning arm 24 can, for example, be effected by suitably driving the wheels 22. These can be driven in either direction as shown by arrows D and E and can also pivot to allow the vehicle to go forward.

The rear pick-up rotors 12 and 13 have a fixed direction of rotation as shown by arrows F and G, but the front rotor 14 is able to reverse as shown by the double-headed arrow H. The front rotor is also capable of being lifted up out of use as shown by broken lines 14'.

In operation, the broiler harvester 10 starts with the conveyor 18 running and the turntable 32 and pick-up rotors 12, 13, 14 rotating. The front rotor 14 rotates in the same direction as the direction of scan.

The pick-up head then scans through the birds (FIGS. 2 and 3) lifting the birds up from the litter and placing them onto the conveyor 18. The birds then run along the conveyor until they drop onto the turntable 32. They continue to travel with the turntable 32 until they are lifted off either by hand or by machine and are then packed into crates or modules.

Figure 5:
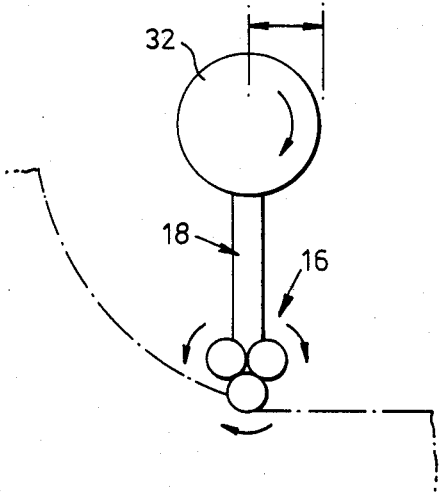

When the scanning arm reaches the end of its travel (FIG. 4), the direction of rotation of the rotor front 14 is reversed and the vehicle moves forward as shown by the arrows in FIG. 5. The arm 74 then scans back in the reverse direction.

Turning now to FIGS. 6a and 6b, these show an embodiment of the invention in which the pick-up head 16 is mounted on a rigid frame 34 which forms the main chassis of the machine.

At the rear, the chassis is supported by two ground wheels 36 mounted on a differential axle 38 which can be used to drive the machine forward in the normal way and also to allow the machine to scan round on axis XX. This latter effect is achieved by locking the input shaft on the differential so as to allow the wheels 36 to move in opposite directions to each other only. Thus when the machine is scanned round by the driving of the front wheels 22, the rear wheels 36 will move exactly the same amount as each other but in opposite directions, making the machine pivot around the centre of the differential unit which would be on axis XX. The machine can then be made to move forward again by releasing the lock on the input shaft and driving it in the normal way until the machine is in the next position to scan.

As will be clear, the same reference numerals and reference letters have been used in FIGS. 6a, 6b as were used in FIGS. 1a, 1b for like parts or motions in the first embodiment of the invention.

We claim:

1. A poultry harvester comprising:
   two rotors arranged side by side with each said rotor providing a continuous array of radially extending guide elements co-operating with the guide elements of the other rotor;
   a third such rotor arranged in front of and co-operating with the other two rotors in a triangular formation;
   means supporting said rotors;
   drive means for rotating the rotors about vertical or predominately vertical axes so that the guide elements co-operate to capture and transmit birds between the rotors to a discharge location; and conveyor means juxtaposed with said discharge location for elevating the captured birds and conveying them to a site which is arranged to permit removal and packing of the captured, transmitted, elevated and conveyed birds.

2. A poultry harvester as claimed in claim 1 adapted to collect birds in a scanning movement with the front rotor rotating in the direction of scan.

3. A poultry harvester as claimed in claim 2, said rotor supporting means including a support arm and in which the three rotors are carried at one end of the support arm which is pivotally mounted at its other end for movement about a vertical axis.

4. A poultry harvester as claimed in claim 2, said rotor supporting means including a support arm and in which the three rotors are carried at one end of the support arm which is mounted at its other end on a ground-wheel supported chassis incorporating a differential gear between the ground wheels.

* * * * *